US012633426B2

(12) United States Patent
Lindner et al.

(10) Patent No.: US 12,633,426 B2
(45) Date of Patent: May 19, 2026

(54) METHOD FOR DETERMINING REAL-TIME THERMAL POWER OF A NUCLEAR REACTOR BASED ON NUMBER OF GAMMA RAYS COUNTED

(71) Applicant: MAX-PLANCK-GESELLSCHAFT ZUR FÖRDERUNG DER WISSENSCHAFTEN E.V., Munich (DE)

(72) Inventors: Manfred Lindner, Heidelberg (DE); Christian Buck, Heidelberg (DE); Janina Hakenmüller, Heidelberg (DE); Gerd Heusser, Gaiberg (DE); Werner Maneschg, Heidelberg (DE); Herbert Strecker, Hoffenheim (DE)

(73) Assignee: MAX-PLANCK-GESELLSCHAFT ZUR FORDERUNG DER WISSENSCHAFTEN E.V., Munich (DE)

( * ) Notice: Subject to any disclaimer, the term of this patent is extended or adjusted under 35 U.S.C. 154(b) by 521 days.

(21) Appl. No.: 17/791,612

(22) PCT Filed: Jan. 8, 2021

(86) PCT No.: PCT/EP2021/050305
§ 371 (c)(1),
(2) Date: Jul. 8, 2022

(87) PCT Pub. No.: WO2021/140220
PCT Pub. Date: Jul. 15, 2021

(65) Prior Publication Data

US 2023/0054651 A1 Feb. 23, 2023

(30) Foreign Application Priority Data

Jan. 10, 2020 (EP) .................................... 20151265

(51) Int. Cl.
*G21C 17/022* (2006.01)
*G21C 7/36* (2006.01)
(Continued)

(52) U.S. Cl.
CPC ............. *G21C 17/022* (2013.01); *G21C 7/36* (2013.01); *G21C 17/104* (2013.01); *G21D 1/02* (2013.01)

(58) Field of Classification Search
CPC ...... G21C 17/022; G21C 7/36; G21C 17/104; G21D 1/02
(Continued)

(56) References Cited

U.S. PATENT DOCUMENTS 3,819,936 A 6/1974 Weiss et al.
4,735,763 A 4/1988 Pettus et al.
(Continued)

FOREIGN PATENT DOCUMENTS

CN 108463856 A 8/2018
GB 1356511 6/1974
(Continued)

OTHER PUBLICATIONS

Solid State Radiations Inc., "Final Report On Further Development of Semiconductor Detectors for Gamma Transient Detection", University of California Lawrence Radiation Lab order #8107705, UCRL-13272, pp. 1-5, no date. (Year: 0000).*
(Continued)

*Primary Examiner* — Jack W Keith
*Assistant Examiner* — Daniel Wasil
(74) *Attorney, Agent, or Firm* — PEARL COHEN ZEDEK LATZER BARATZ LLP

(57) ABSTRACT

A method for determining real-time thermal power of a nuclear reactor based on number of gamma rays counted comprising measuring a number of gamma-ray counts by a
(Continued)

gamma-ray detector that is placed outside a biological shield at a primary cooling circuit of a fission nuclear power plant so that maintenance of the detector is possible during normal operation of the fission nuclear power plant, and determining, by a computing device in real-time, a thermal power of the fission nuclear power plant based on the number of gamma-ray counts measured by the gamma-ray detector.

10 Claims, 5 Drawing Sheets

(51) Int. Cl.
*G21C 17/104* (2006.01)
*G21D 1/02* (2006.01)

(58) Field of Classification Search
USPC .................................................. 376/245, 259
See application file for complete search history.

(56) References Cited

U.S. PATENT DOCUMENTS

| | | | | |
|---|---|---|---|---|
| 5,108,694 | A * | 4/1992 | Stucker | G21C 17/022 376/245 |
| 5,774,515 | A | 6/1998 | Fujiwara et al. | |
| 8,907,290 | B2 * | 12/2014 | Kim | G01T 1/248 250/363.03 |
| 8,946,645 | B2 | 2/2015 | De Volpi | |
| 2003/0026374 | A1 | 2/2003 | Ruddy et al. | |

FOREIGN PATENT DOCUMENTS

| | | | |
|---|---|---|---|
| JP | S61-162794 | A | 7/1986 |
| JP | H04329398 | A | 11/1992 |
| JP | H5-203782 | A | 8/1993 |
| JP | H6-130177 | A | 5/1994 |
| JP | 2001099981 | A | 4/2001 |
| JP | 2011 252817 | A | 12/2011 |
| JP | 2016-080587 | A | 5/2016 |

OTHER PUBLICATIONS

Abdi, “Prompt gamma radiation as a new tool to measure reactor power”, Radiation Physics and Chemistry 91 (2013): 19-27. (Year: 2013).*

“Reconsideration Report by Examiner before Appeal” in Japanese Patent Application 2022-541960, dated Mar. 14, 2025. (Year: 2025).*

International Search Report for application No. PCT/EP2021/050305, dated Mar. 24, 2021.

Search Report for Japanese patent application No. JP 2022-541960, dated Feb. 20, 2024.

Office Action for Chinese Application No. 202180008811.4 dated May 30, 2025.

* cited by examiner

METHOD FOR DETERMINING REAL-TIME THERMAL POWER OF A NUCLEAR REACTOR BASED ON NUMBER OF GAMMA RAYS COUNTED

CROSS-REFERENCE TO RELATED APPLICATIONS

This application is a National Phase Application of PCT International Application No. PCT/EP2021/050305, International Filing Date Jan. 8, 2021, claiming priority of European Patent Application No. 20151265.4, filed Jan. 10, 2020, which is hereby incorporated by reference.

TECHNICAL FIELD

The present disclosure refers to the technical field of measuring thermal power of a nuclear reactor, especially the field of real-time precision measurement of the thermal power of a nuclear reactor.

BACKGROUND ART

The control and measurement of the thermal power of a nuclear reactor is a key-challenge for the safe operation of such a reactor. As the thermal power of a nuclear reactor can fast increase due to the nuclear fission chain reaction in the reactor it very important for control and safety to have real-time data with minimal delay of real-time the thermal power of a nuclear reactor.

General approaches to the problem of real-time measurement of the thermal power of a nuclear power plant have been previously made and are referred here. For example, three standard methods of measuring the thermal power of a nuclear reactor are known. One standard method is the so called in/-ex core instrumentation, the second standard method is to measure the enthalpy in the secondary cooling cycle and the third standard method is to fill small pipes within the reactor with small metal spheres that are activated by the neutrons, these spheres are removed from time to time and the activity is measured.

Still further, U.S. Pat. No. 5,774,515 A discloses a neutron particle measuring apparatus including a neutron converter to generate alpha rays in response to incidence of neutron, a scintillator to receive as input the alpha rays generated from the neutron converter so as to emit and transmit scintillation, two photoreceptive portions to receive the scintillation through different transmitting paths, and a signal processing portion to measure a neutron distribution depending upon times at which the scintillation can reach the photoreceptive portions according to a time-of-flight method.

U.S. Pat. No. 8,946,645 A discloses a radiation-monitoring diagnostic hodoscope system for producing an approximate image of radiation-detecting components within or external to a pressure vessel of an operating, damaged, or shutdown nuclear-power plant.

US patent application US 2003/0026374 A1 discloses a solid state semiconductor neutron detector that automatically varies its sensitivity to provide a pulsed output over the entire range of operation of a nuclear reactor. The sensitivity is varied by changing the thickness or makeup of a converter layer that emits charged particles to the active region of the semiconductor surface.

In this known technology, the thermal power of the nuclear reactor is determined by measuring neutrons from the fission reaction which can only be measured within the reactor vessel so that the detectors have to be installed inside or near the vessel or by monitoring the heat flow in the secondary circuit. The most relevant parameters in these calculations are the mass flow of the feed-water and the specific enthalpy rise in the steam generator including corrections.

In the light of this known technology the object of the present invention is to provide in terms of precision and real-time demand an innovative technique for measuring the thermal power of a nuclear power plant.

Also, the previous mentioned standard apparatuses are expensive, unwieldy or very complex. There is a need for a mobile, easy to handle, easy to maintain and a convenient detector and methodology.

SUMMARY OF THE INVENTION

According to a first aspect the disclosure provides a method comprising measuring the thermal power of a nuclear power plant with a gamma-ray sensitive detector that is placed outside a biological shield of a nuclear reactor core, which is accessible also during reactor ON times.

According to a second aspect the disclosure provides the use of a gamma-ray sensitive detector for measuring the thermal power of a nuclear power.

Further aspects are set forth in the dependent claims, the following description and the drawings.

BRIEF DESCRIPTION OF THE DRAWINGS

Embodiments are explained by way of example with respect to the accompanying drawings, in which:

FIG. 4 shows measured data of an apparatus according to the present invention and data of a reference diagnostic; and in which

DETAILED DESCRIPTION OF EMBODIMENTS

Figure 1:
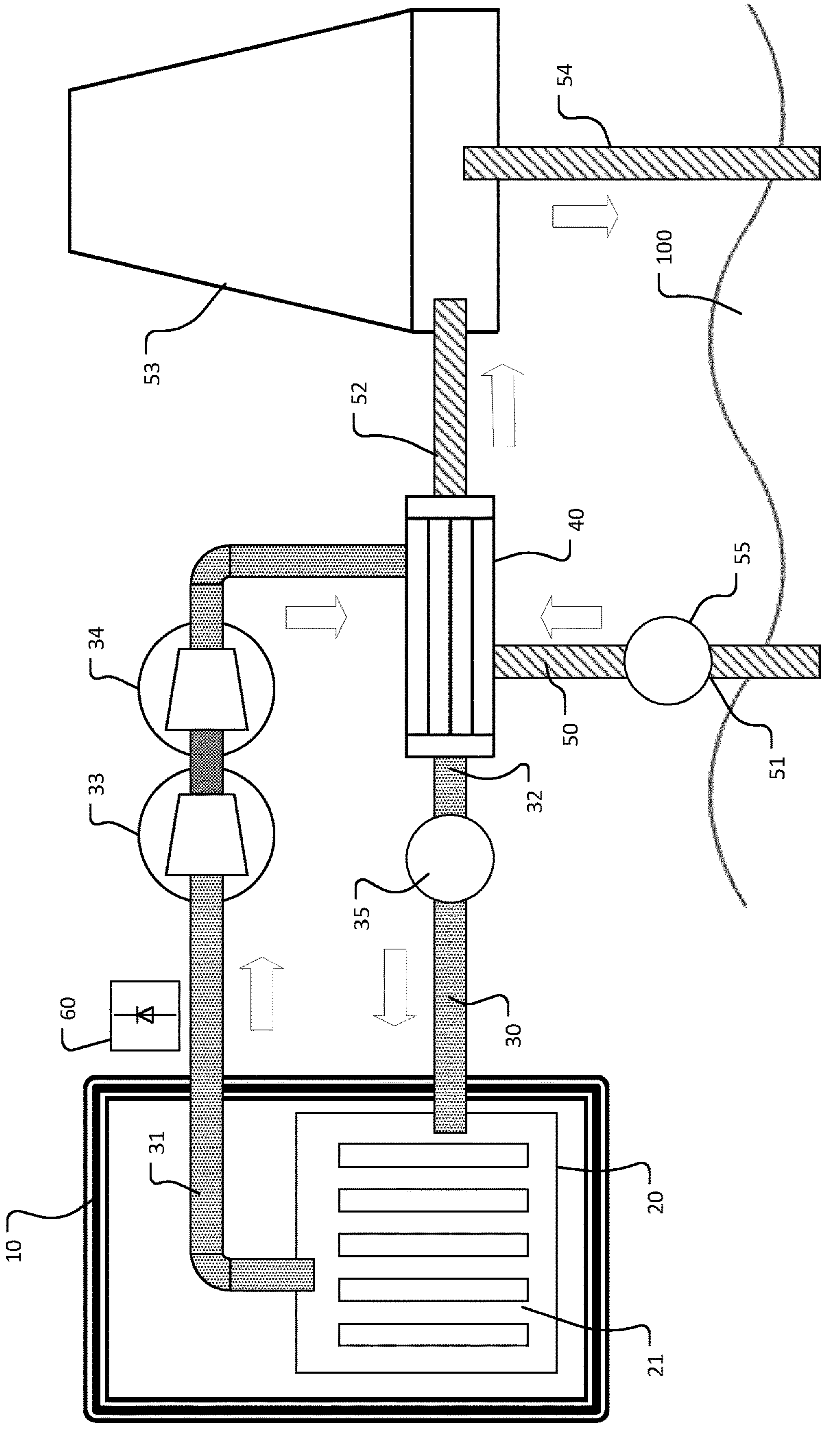
FIG. 1 schematically shows the functional structure of a nuclear power plant using the boiling water reactor type with a gamma-ray sensitive detector comprising a germanium diode, which is situated near the primary water-cooling circuit and outside the steel-enforced concrete biological shield of the reactor.

The embodiments described in more detail below disclose a method comprising measuring a number of gamma-ray counts in a gamma-ray sensitive detector that is placed outside a biological shield near a primary cooling circuit of a nuclear power plant, and determining the thermal power of the nuclear power plant based on the number of gamma-ray counts measured in the gamma-ray sensitive detector. The nuclear power plant may be any kind of nuclear reactor heating up water with the energy of nuclear fission reactions.

The thermal power measured may relate to the amount of thermal energy per time released in the reactor vessels by nuclear fission reactions within the fuel rods of the nuclear power plant.

The present disclosure allows a mobile, compact and easy to handle, easy to maintain, convenient real-time detector and methodology which is cheap, very reliable, precise, safely accessible at any time during reactor operation since it can be located outside the biological shield of the reactor. An operation inside the biological shield is not necessary, so that it can be accessed during reactor operation. The technology is also non-invasive and meets all restrictions for technology which is allowed inside a reactor complex. The technology has been demonstrated and it works for any type of nuclear reactor (BWR, PWR, . . . ) and can be universally employed for any reactor size from power reactors to small research reactors.

A biological shield (also called "primary shield") of a nuclear power plant may be any barrier, for example lead barriers or steel-enforced concrete walls that prevent radiation and radio-active isotopes from escaping to the environment. The biological shield absorbs mainly neutrons, but also gamma radiation and guarantees that the staff of the nuclear power plant can move freely outside of it (in the "secondary" rooms) during the reactor operation. The staff can enter inside the reactor core only when the reactor is shut down. As measurements are taken with the detector being outside of the biological shield of the nuclear reactor, the gamma-ray sensitive detector may be accessible without any additional safety precautions also during full power reactor operation. The embodiments described below in more detail may provide the technical effect that in a nuclear reactor, the thermal power can be determined without needing access to the reactor vessel. Accordingly, when installing, calibrating or maintaining the detectors, the biological shield of the reactor does not present no barrier for technical staff, also during reactor ON times. The biological shield does not hinder the technical staff from accessing the detectors.

The term "number of gamma-ray counts" denotes that the number of gamma photon events measured in the gamma-ray sensitive detector is counted. In particular, the gamma-ray sensitive detector may be a gamma-ray sensitive spectrometer, i.e. a device that is able to detect incoming photons and to determine their energy to produce a gamma-ray spectrum. According to the embodiments, a gamma-ray spectrometer provides information on how many photons of the same energy have been detected per energy bin. This information may for example be visualized in a two-dimensional Energy-Count diagram N(E).

The method may further comprise measuring a number of gamma-ray counts in the gamma-ray sensitive detector that are emitted by neutron absorption. The term "neutron absorption" describes a nuclear process in which an isotope catches and absorbs an incoming neutron. The rate of decays caused by neutron absorption is directly correlated to the thermal power of the nuclear reactor. The method may for example be based on the measurement of decays of short-living isotopes that are caused by neutron absorption within the reactor of the cooling water of the primary water-cooling of the reactor within steel enforced concrete structures.

The method may further comprise measuring a number of gamma-ray counts in the gamma-ray sensitive detector that relate to a decay caused by an isotope that has a short half-life. Any isotope with a half-life that results in a significant gamma-ray activity may be used for the purpose of the embodiments. For example, a half-life at the order of magnitude of a few minutes or less, and that is created by a neutron absorption event within the reactor or the cooling water.

The method may further comprise measuring the number of gamma-ray counts of N16-decays. The N16-decay is a special process occurring within water that is irradiated with neutrons. Here the oxygen-16 atom of water absorbs an incoming neutron by emitting a proton. The remaining atom is in this case a nitrogen atom with a mass number of 16. Nitrogen-16 is unstable and decays with a half-life of 7, 14 s to oxygen-16 by emitting an electron (Beta-decay). This oxygen-16 atom is excited and therefore emits photons by radiative deexcitation with a characteristic energy of 6.1 MeV. These photons can be measured for the purpose of determining the thermal power of a nuclear reactor according to the present invention. By measuring the number of gamma-ray counts of N16-decays, a high detector efficiency for high-energetic gamma-rays with energies between 5 and 10 MeV may be advantageous.

A primary cooling circuit of the nuclear power plant may be a cooling circuit that provides a reactor vessel of the nuclear reactor with cooling water. For example, the water of the primary cooling circuit may bath fuel rods of the nuclear power plant. The primary cooling circuit starts in the reactor core, but leads out of the biological shield to the steam pressure generators.

Since part of the primary cooling circuit and the steam generators are located outside the biological shield and these still emit considerable radiation, these parts are further extra shielded with typically ~1 m of concrete, so that the staff can operate even in their immediate vicinity. This is sometimes referred to as the 'second' shield.

According to the embodiments, the gamma-ray sensitive detector may be placed near the primary cooling circuit of the nuclear reactor. In particular the gamma-ray sensitive detector may be placed as close as possible to the primary cooling circuit so that the measurement signal of the gamma-ray sensitive detector is maximized. The proximity to the primary cooling circuit is helpful to increase the measurement signal of the gamma-ray sensitive detector. For example approximately 5 meters or less distance to any section of the primary cooling circuit (with ~1 meter concrete in between, related to the 'second' shield) may provide high gamma radiation intensities. The selection of suitable measurement sites is thus not limited to the immediate vicinity of the biological shield, but can be extended to many locations within the containment vessel. The gamma-ray sensitive detector may for example be placed as close to the biological shield as possible respectively as near to the primary cooling circuit while being outside of the biological shield as possible so that the measurement signal of the gamma-ray sensitive detector is maximized. For example, the gamma-ray sensitive detector may be placed directly to a steel-enforced concrete wall of the nuclear power plant's biological shield separating the primary cooling circuit from the external environment. However, in alternative embodiments, the gamma-ray sensitive detector may be placed at any position outside of the biological shield at which there is enough measurement signal of the gamma-ray sensitive detector to obtain significant measurement results.

The method may further comprise determining the thermal power of the nuclear power plant based on a number of gamma-ray counts obtained with the gamma-ray sensitive detector and based on a calibration value obtained from a calibration measurement. This calibration measurement can be achieved by any conventional standard technique known to the skilled person to determine the thermal power of a nuclear power plant, for example by measuring the heat flow in the secondary circuit.

The method may further comprise determining the thermal power of the nuclear power plant based on a number of gamma-ray counts obtained with the gamma-ray sensitive detector and based on a geometrical model of the nuclear reactor. Such a geometrical model may consider the geometric dimensions of the reactor vessel, the probability of a neutron absorption within the cooling water, the position of the detector relative to the cooling circuit, the directional characteristic of the gamma-ray radiation, the pumping speed within the primary cooling circuit, the number of neutrons emitted by fission and the detector efficiency of the used detector.

The method may further comprise measuring a number of gamma-ray counts in the gamma-ray sensitive detector with a germanium diode or silicon diode, or other ionization/scintillation detector or bolometric spectrometer. The following disclosure provides a gamma-ray sensitive detector comprising a large germanium diode (e.g. 2 kg), which is operated with an electrical cryo-cooling within the security perimeter of a nuclear power plant but outside the biological shield of the nuclear power plant.

The method may enable a very precise, non-invasive, failsafe, stable and efficient measurement of the thermal power of a nuclear power plant in real-time.

Further, the embodiments also disclose the use of a gamma-ray sensitive detector, that is placed outside a biological shield (10) near a primary cooling circuit (30) of a nuclear power plant, for measuring the thermal power of a nuclear power plant is provided by the present invention. As it will be described later, a conventional gamma-ray sensitive detector cooled with an electrical cryocooling system can be used for the determination of the thermal power of a nuclear power plant as described in the embodiments in more detail. This use of a gamma-ray sensitive detector may refer to a gamma-ray sensitive detector comprises a germanium diode or a silicon diode, or other ionization/scintillation detector or bolometric spectrometer.

FIG. 1 schematically shows an embodiment of the functional structure of a nuclear power plant of the boiling water reactor type. A gamma-ray sensitive detector comprising a germanium diode is situated near the primary water-cooling circuit and outside the steel-enforced concrete biological shield of the reactor. Note, that it is preferable to use a germanium diode since germanium has a very good detection capability in the energy range relevant for the present invention. Nevertheless, the detection diode can be made of other materials, preferably semiconductor materials, for example silicon. Any material that seems beneficial for gamma-ray detection and with a high enough detector efficiency for energies of 1-10 MeV to the skilled person can be used.

In a nuclear power plant, fuel rods 21 which are typically made out of zirconium alloy that is filled with uranium dioxide pellets are placed within a water-filled vessel 20. The uranium is enriched in U235. So-called MOX elements also contain plutonium. Within the fuel rods 21 a nuclear fission chain reaction is occurring that causes the fuel rods 21 to heat up. The vessel is surrounded by a biological shield 10. The biological shield 10 keeps the radioactivity inside the biological shield 10 from escaping into the environment of the reactor. The biological shield 10 comprises mostly thick steel-enforced concrete walls and lead barriers. A primary pump 35 pumps water from a primary cooling circuit 30 into the vessel 20. The heated fuel rods 21 are bathed by the water of the primary cooling circuit 30 cooling the fuel rods. This cooling process produces steam that is pumped by the primary pump 35 from the vessel 20 through a pipe 31 to the turbines 33 and 34 that use the steam to produce electricity. The steam is cooled by a secondary cooling circuit 50 of a condenser 40 and condenses. After the condenser 40, the condensed water of the primary cooling circuit 30 is pumped back by the primary pump 35 through a pipe 32 into the vessel 20.

The secondary cooling circuit 50 is realized by pumping cool water from a river 100 by a secondary pump 55 through a pipe 51 into the condenser 40. The cool water from the river is heated by the steam coming from the turbines 33 and 34. The heated cooling water of the secondary cooling circuit 50 is then pumped through a pipe 52 into a cooling tower 53. In the cooling tower 53, the heated water can evaporate. Remaining warm water of the second cooling circuit is pumped back into the river 100 through a pipe 54. In this way it is ensured that no contaminated water from the primary cooling circuit gets into the environment.

A gamma-ray sensitive detector 60 is placed outside the biological shield and near the primary cooling circuit 30, preferably in the vicinity of the outgoing pipe 31. The gamma-ray sensitive detector 60 comprises a large germanium diode with a mass of e.g. 2 kg, which is electrically cryo-cooled. An embodiment of gamma-ray sensitive detector 60 is described in more detail below with regard to FIG. 4. The gamma-ray sensitive detector 60 measures photons produced in the water of the primary cooling circuit 30 such as described in more detail below, with regard to FIG. 3.

As the gamma-ray sensitive detector 60 is placed outside the biological shield and near the primary cooling circuit 30, the process of measuring the thermal power is non-invasive. Still further, the gamma-ray sensitive detector 60 requires low maintenance. As the detector 60 is placed outside the biological shield, maintenance is possible during normal operation. From practical experience it is expected that arranging and placing the gamma-ray sensitive detector as described in the embodiment will require little maintenance of the detector. In comparison to this, constant calibrations are necessary for the so far customary excore and incore instrumentation (neutron detectors known from the state of the art) and after longer periods of time, radiation damage occurs on such detectors. The electrical cryogenic cooling replaces the cooling for such detectors, in which weekly liquid nitrogen is replenished. This saves time and complies with the safety regulations in the safety area of a nuclear power plant.

Still further, as the gamma-ray sensitive detector 60 is placed outside the biological shield, the gamma-ray sensitive detector 60 is more reliable and stable on a long-term perspective than previous detectors. It may for example happen that the data for the official simulation calculation of the thermal power is missing for several hours. However, the detector setup described above normally continues to measure in a reliable way at low power consumption and fast computational time and thus improves the safety of the nuclear power plant.

In the embodiment of FIG. 1, only one gamma-ray sensitive detector 60 is shown. However, in alternative embodiments, a network of germanium detectors may be installed per nuclear power plant, e.g. for reasons of redundancy. As the detector is cost-effective, even if some germanium detectors are installed per nuclear power plant, the costs are manageable.

In the embodiment of FIG. 1, the gamma-ray sensitive detector 60 is placed near the biological shield 10 of the reactor of the nuclear power plant. The gamma-ray sensitive detector 60 is preferably placed as close to the biological shield as possible so that the measurement signal of the gamma-ray sensitive detector 60 is maximized. However, in alternative embodiments, the gamma-ray sensitive detector 60 may be placed at any position outside of the biological shield 10 at which there is enough measurement signal of the gamma-ray sensitive detector 60 to obtain significant measurement results. For example, a measurement signal of 100 gamma-ray counts per second or higher may allow for significant conclusions on the thermal power of the nuclear power plant.

Figure 2:
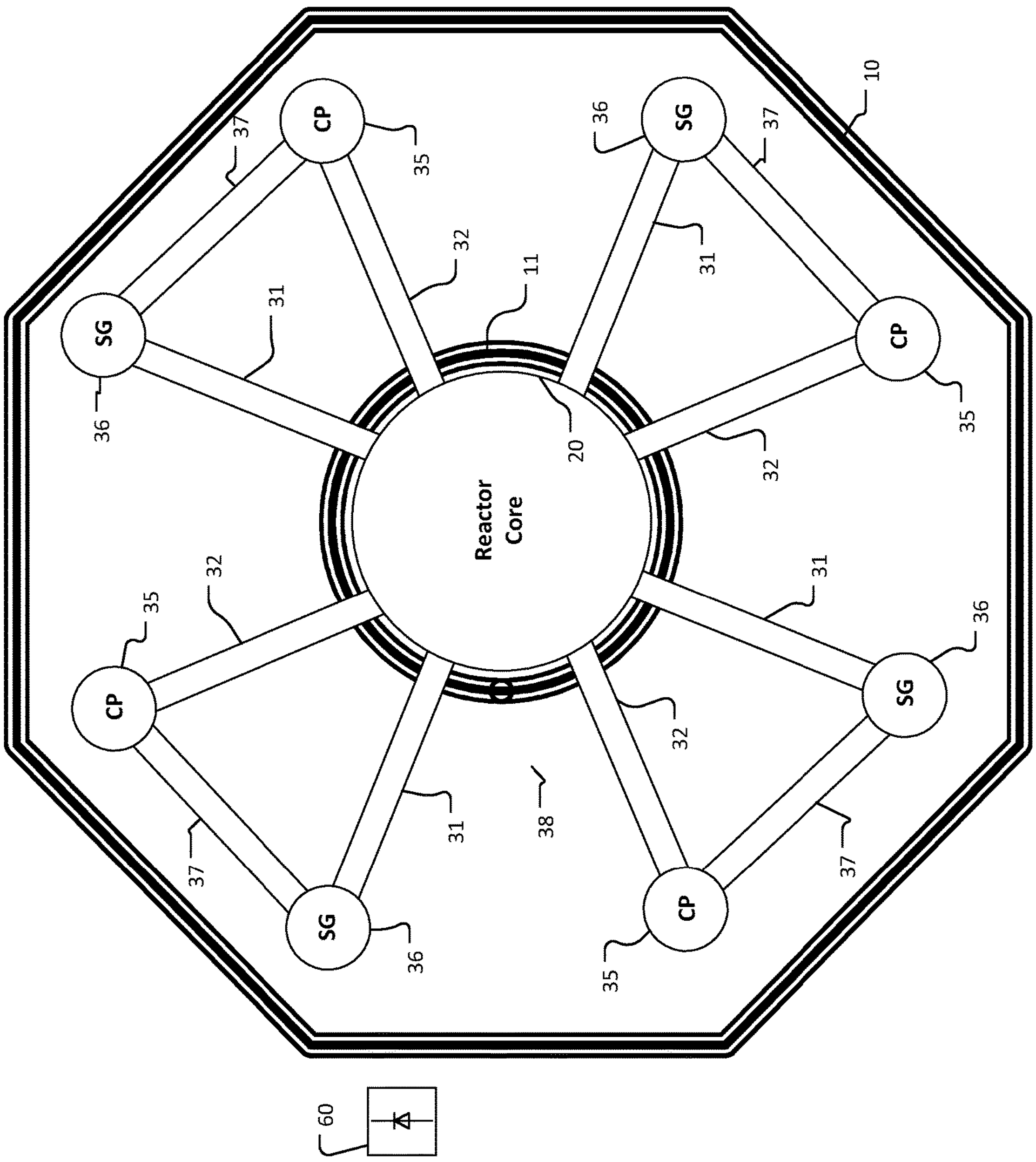
FIG. 2 schematically shows the functional structure of the inner side of the shielding biological shield of a nuclear power plant using the pressurized water reactor type with a gamma-ray sensitive detector comprising a germanium diode, which is situated outside the steel-enforced concrete shielding biological shield of the reactor.

The concept of power plant construction as shown in FIG. 1 is called boiling water reactor (BWR), because the water of the primary cooling circuit evaporates and drives the turbines 33 and 34. There is also a second concept of power plant construction, the so-called pressurized water reactor (PWR). In the pressurized water reactor (PWR) the primary cooling circuit is hold under pressure such that the water cannot evaporate. Instead, an intermediate cooling circuit is integrated between primary and secondary cooling circle. The water of the primary cooling circuit heats the water of the intermediate cooling circuit in a steam generator, where the water of the intermediate cooling circle evaporates, and the generated steam drives the turbines. After that, the steam of the intermediate cooling circle is cooled in a condenser by a secondary cooling circle similar to the mechanism shown in FIG. 1. The present invention is deployable in both, BWR and PWR nuclear power plants as well as in smaller-sized scientific reactors. FIG. 2 shows the application of the present invention in a pressurized water reactor type.

The two most common fission reactions in a fuel rod (21 in FIG. 1) with in a reactor of a nuclear power plant are $$n + {}^{235}_{92}\mathrm{U} \rightarrow 3n + {}^{235}_{92}\mathrm{Ba} + {}^{92}_{36}\mathrm{Kr} + 170\ \mathrm{MeV}$$

and $$n + {}^{239}_{94}\mathrm{Pu} \rightarrow 3n + {}^{134}_{54}\mathrm{Xe} + {}^{103}_{40}\mathrm{Zr} + 207\ \mathrm{MeV}$$

Each fission reaction is caused by neutron absorption and itself generates new neutrons. Generally, each fission reaction produces more free neutrons, than it consumes. Therefore, if each free neutron causes a new fission reaction, this would lead to a cascade of fission reaction unleashing more and more energy.

Within a reactor of a nuclear power plant the nuclear chain reaction is controlled by ensuring that from each chain reaction averagely only one neutron causes a new fission reaction. This can be achieved by absorbing excess neutrons through other non-fissile atoms. Such materials used for neutron absorption can be for example Cd-113 or Bor-10. Also materials for slowing down the neutrons are used. These materials are called moderators. Such moderator materials can be graphite or also the water of the primary cooling circuit within the vessel.

For the determination of the thermal power of the nuclear power plant, any photons can be used which are related to the thermal power production of the nuclear power plant. In particular, any photons that are emitted by neutron absorption allow a conclusion on the thermal power produced by the nuclear power plant. In particular, for the determination of the thermal power of the nuclear power plant, any decay caused by an isotope that has a reasonable short half-life (for example 5 min or less) and that is created by a neutron absorption event within the reactor or the cooling water can be used.

For example, the photons caused by N-16 decays may be measured for the determination of the thermal power of the nuclear power plant:

FIG. 2 schematically shows an embodiment of a functional structure of the inner side of the biological shield of a nuclear power plant of the pressurized water reactor type. A gamma-ray sensitive detector 60 comprising a germanium diode is situated outside the steel-enforced concrete biological shield of the reactor. The reactor core is environed by an inner biological shield 11 made out of steel-enforced concrete and the reactor vessel 20 is filled by water cooling the fuel rods. The water is pumped through the loop pipes 31, 32 and 37 by the main cooling pumps 35. Hot water from the reactor vessel is pumped through the loop pipe 31 to a steam generator 36 in which the hot water is cooled by evaporating water of an intermediate cooling circle, the generated steam driving the turbines 33 and 34 for electricity generation. The cooled water is then pumped from the steam generator 36 away through the cooling pump 35 through the loop pipes 37 and 32 back into the reactor vessel 20.

The reactor core and the primary cooling circuit are environed by an outer biological shield 10 made out of steel-enforced concrete. The whole area 38 within the outer biological shield is inaccessible during the operation of the reactor because the lethal amount of radioactive radiation within the area 38. As already described above, the neutron flux within the reactor vessel generates N16 atoms that decay rapidly and thereby generate photons. Those photons can leave both biological shields 10, 11 and can therefore be measured by the gamma-ray sensitive detector 60 placed near the outer biological shield 10 of the reactor of the nuclear power plant together with photons from decays that occur in the pipes and which only have to pass the outer biological shield making them more likely to be detected. The gamma-ray sensitive detector 60 is preferably placed as close to the outer biological shield as possible so that the measurement signal of the gamma-ray sensitive detector 60 is maximized. However, in alternative embodiments, the gamma-ray sensitive detector 60 may be placed at any position outside of the outer biological shield 10 at which there is enough measurement signal of the gamma-ray sensitive detector 60 to obtain significant measurement results. For example, a measurement signal of 100 gamma-ray counts per second or higher may allow for significant conclusions on the thermal power of the nuclear power plant. As the gamma-ray sensitive detector 60 is outside the area 38 it is accessible during the operation of the reactor.

Figure 3:
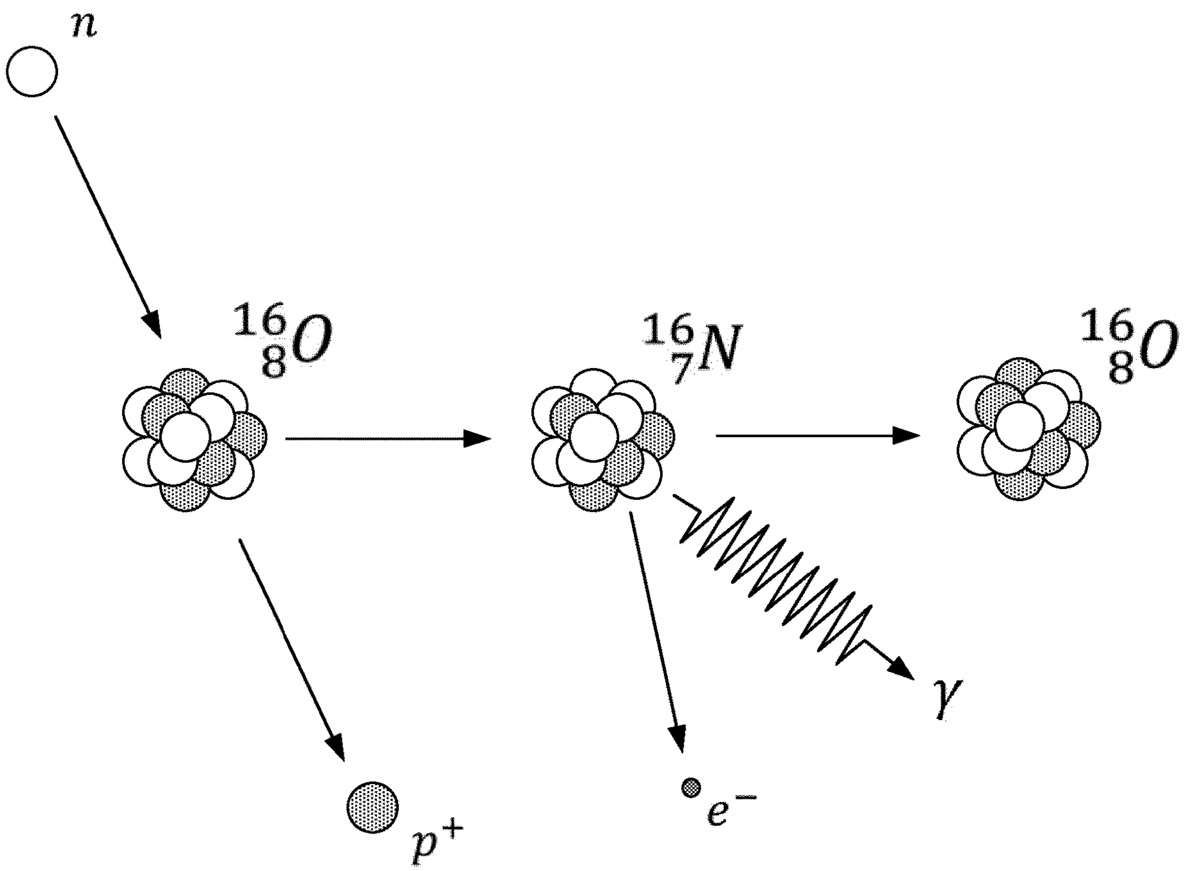
FIG. 3 schematically describes an embodiment of a gamma-ray sensitive detector 60 as used in the nuclear power plant of FIG. 1 to determine the thermal power of the nuclear power plant.

FIG. 3 schematically shows the production and the decay of N-16 atoms within the cooling water of the primary cooling of a nuclear reactor. The water of the primary cooling circuit 30 bathing the fuel rods 21 is used both for cooling the fuel rods 21 and slowing down neutrons of the nuclear fission reactions. Therefore, the water molecules $H_2O$ are irradiated with a high number of neutrons from the nuclear fission reaction.

The oxygen atom within the water molecule is with 99, 72% probability an O-16 atom composed of 8 neutrons and 8 protons. An O-16 atom can transmute to N-16 by absorbing a neutron while emitting a proton:

$${}^{16}_{8}\mathrm{O}+n \rightarrow {}^{16}_{7}\mathrm{N}+p^{+}$$

As the water molecules $H_2O$ are irradiated with neutrons from the nuclear fission reaction, some of the oxygen atoms within the cooling water are transmuted to N-16 atoms. As the neutron absorption probability is independent from the number of free neutrons available, the number of generated N-16 atoms is proportional to the number of fission reactions within the fuel rods 21. As each fission unleashes nearly the same amount of energy, the number of fission reactions per time is (averagely) proportional to the thermal power of the fuel rods 21. As such, the number of N-16 atoms in the water of the primary cooling circuit is proportional to the thermal power of the nuclear reactor.

N-16 is an radioactive isotope with a half-life of 7.13 seconds. As shown, N-16 decays under emission of an electron and a photon back to an O-16 atom:

$$^{16}_{7}N \rightarrow ^{16}_{8}O + e^{-}$$

The energy of the emitted photon is located around 6.1 MeV. Photons are difficult to shield and can therefore transmit the thick steel-enforced concrete wall biological shield 10 of the reactor. Therefore the emitted photons are measurable outside the biological shield. By measuring the number of high-energy gamma-ray counts it is possible to place the gamma-ray sensitive detector 60 outside of the biological shield. The detector can measure the N-16-decay rate based on the detection of high-energy-gamma-photons, which penetrate the biological shield. Preferably the detector 60 is placed in the vicinity of a pipe segment of the primary cooling circuit 30 that is near to the reactor vessel 20. In modern nuclear power plants, the pumping speed within the primary cooling circuit is very high, so that large areas of the primary cooling circuit are adequate for placing the gamma-ray sensitive detector 60.

The proposed method for measuring the thermal power of a nuclear power plant makes use of the proportional relationship between gamma-detection-rate and thermal power:

$$P_{therm} = f_P \cdot \dot{N}_{dety}$$

The proportionality factor $f_P$ can either be measured by a reference diagnostic or can be calculated by a numerical geometrical model of the reactor.

That is, the determination of the thermal power of the nuclear power plant may be based on a number of gamma-ray counts obtained with the gamma-ray sensitive detector and based on a calibration value obtained from a calibration measurement.

Alternatively, the determination of the thermal power of the nuclear power plant may be based on a number of gamma-ray counts obtained with the gamma-ray sensitive detector and based on a geometrical model of the nuclear reactor. Such a geometrical model may consider the geometric dimensions of the reactor vessel, the probability of a neutron absorption within the cooling water, the position of the detector relative to the cooling circuit, the directional characteristic of the gamma radiation and the detector efficiency of the used detector.

It should however be noted that even without using a calibration measurement or a geometrical model (i.e. without knowing the proportionality factor $f_P$), relative statements about the thermal power can be made. For example, if the detection rate within the detector 60 doubles, one may conclude that the thermal power has also doubled.

Figure 4:
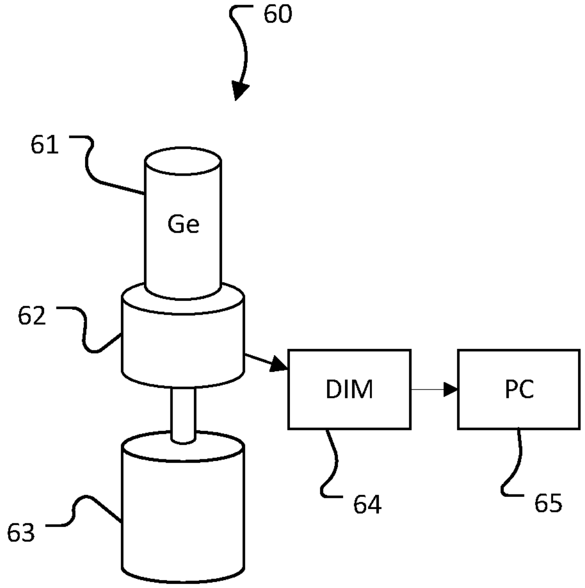

FIG. 4 schematically describes an embodiment of a gamma-ray sensitive detector 60 as used in the nuclear power plant of FIG. 1 to determine the thermal power of the nuclear power plant. As described with regard to FIG. 1 above, the gamma-ray sensitive detector 60 is placed outside the biological shield (10 in FIG. 1) and near the primary cooling circuit (30 in FIG. 1), preferably in the vicinity of the outgoing pipe 31. The gamma-ray sensitive detector 60 is a semiconductor detector which comprises a large germanium diode 61 with a mass of e.g. 2 kg. The gamma-ray sensitive detector 60 is relatively compact. It has a little mass (e.g. 15-20 kg) and it therefore can be easily moved by one to two persons. Also, the detector is displaceable during regular operation. Additionally, the detector has little need for space. It can be further optimized, by removing the cryostat arm completely. An additional biological shield made of lead, copper or polyethylene is also not needed for the detector according to the present invention, as the signal-to-background ratio is high (see FIG. 4 and corresponding description). The germanium diode 61 is electrically cooled with an electric cryo-cooling 63. Any known cryostat configurations, dewar sizes and pulsed-tubed cooler configurations known for radiation detector application and allowed by the reactor site management may be used for the detector of this embodiment. A preamplifier 62 is provided to amplify the detection signal.

The germanium diode 61 measures photons caused by N-16 decays within the water of the primary cooling circuit (30 in FIG. 1) such as described in more detail below, with regard to FIG. 4. The detection signal is provided to a detector interface module 64 (DIM), which converts the detection signal into digital data. The detector interface module 64 (DIM) outputs data that describes the gamma-ray spectrum captured by the large germanium diode 61. The gamma-ray spectrum comprises several peaks. The digital data generated by the detector interface module 64 is provided to a computing device 65 (PC) for further processing and visualization. In particular, the spectral data obtained from the detector interface module 64 is integrated over a predefined part of the spectrum to obtain a total count rate of gamma-rays. According to an embodiment, in particular the count rate of the 6.1 MeV line in the spectrum is determined by integrating the count rate of all events in the vicinity of 6.1 MeV, i.e. in a spectral interval around 6.1 MeV of a predefined width (e.g. 6.1 MeV±0.1 MeV). This count rate of the gamma-rays may for example be expressed in Becquerel (Bq) or Giga-Becquerel (GBq).

Note, that it is preferable to use a germanium diode for germanium has a very good detection capability in the energy range relevant for the present invention. Nevertheless, the detection diode can be made of other materials, preferably semiconductor materials, for example silicon. Any material that seems beneficial for gamma-ray detection to the skilled person can be used.

In the computing device 65, the count rate of the gamma-rays expressed in Giga-Becquerel (GBq) may be related to the amount/flow of cooling water within the primary cooling circuit (30 in FIG. 1) of the nuclear power plant monitored by the gamma-ray sensitive detector 60. By arranging and placing the gamma-ray sensitive detector 60 as described above, a high signal strength is achieved. For example, 1 GBq/liter of N-16 activity might be obtained a few meters beside the main cooling lines. Accordingly, high signal strengths of photons are available behind the several meters thick steel-enforced concrete walls in places that are accessible during the normal reactor operation (outside the biological shield).

As described previously, the activity measured by the gamma-ray sensitive detector 60 is proportional to the neutron power/flux and thus to the thermal power of a nuclear power plant. Accordingly, the measured activity provides information about the relative thermal power of a nuclear power plant. Information about the absolute thermal power can be obtained by relating the measurement provided by the gamma-ray sensitive detector to a diagnostic measurement obtained with conventional means, e.g. by measuring neutrons from the fission reaction within the reactor vessel. Such measurement results are available from conventional nuclear power plant monitoring. For each position and configuration of the gamma-ray sensitive detector 60, with only one diagnostics measurement the measurement can be calibrated so that information on the absolute thermal power of a nuclear power plant can be obtained from the activity measurement.

Figure 5:
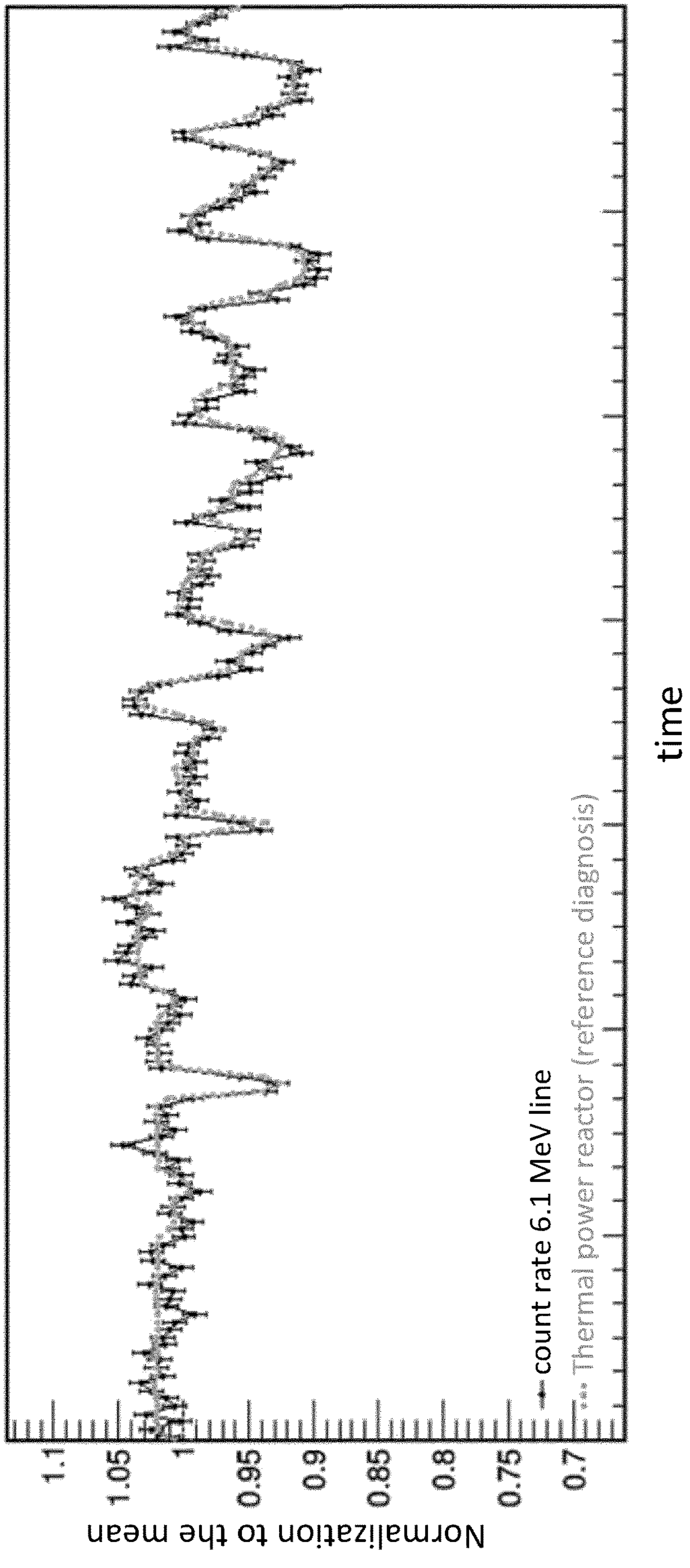
FIG. 5 shows that the gamma-ray sensitive detector of the embodiments provides high-precision, real-time measurements of the thermal power of a nuclear power plant and thus allow for a real-time diagnosis.

FIG. 5 shows a graph of measurement data obtained with a gamma-ray sensitive detector as described above during a time interval of one week. A time interval of seven days is shown on the X axis of the graph, with 24 time bins per day (1 hours per bin). For each bin, the normalized count rate of the photons with such energies (which is proportional to the thermal power generated by the reactor) and its measurement error is shown on the Y axis of the graph. The normalization is performed with regard to the median of the count rate. The graph of FIG. 3 also shows data of a reference diagnostics which was conducted during the same 5 time interval with a traditional measurement process, for example the conventional method based on the enthalpy of the secondary water loop system, and the official simulation calculation of the thermal power. As can be seen, the measured count rate resembles very closely the data of the reference diagnosis.

The graph of FIG. 5 shows that the gamma-ray sensitive detector of the embodiments provides high-precision, real-time measurements of the thermal power of a nuclear power plant and thus allow for a real-time diagnosis. N-16 in the water of the primary cooling circuit is transported from the reactor core in the main cooling lines at high speed (more than 10 m/s), during that time the N-16 atoms decay with a half-life of 7.13 s. This leads to real-time picture of the nuclear fission resulting neutron flux in the core, which is proportional to the generated thermal power. As shown in FIG. 5, high precision measurements are provided. A one-percent accuracy of thermal power measurement can be achieved with a time bins of a few hours. This refers to the typical case of 3 GW of thermal power and the situation that the gamma-ray sensitive detector is located about 4 m away from the main cooling pipes behind about 1.5 meters of steel-enforced concrete. The test setup shows that real-time monitoring with about 10 minutes time bins is realistic with a few percent accuracy (See also FIG. 4). Additionally, the detector is easy to calibrate.

REFERENCE SIGNS LIST

10 outer biological shield
11 inner biological shield
20 reactor vessel
21 fuel rod
30 primary cooling circuit
31 pipe transporting hot water away from the reactor vessel
32 pipe transporting cold water to the reactor vessel
33 turbine
34 turbine
35 primary pump
40 condenser
50 secondary cooling circuit
51 pipe transporting cold water from a river to the condenser
52 pipe transporting warm water away from the condenser
53 cooling tower
54 pipe transporting warm water to the river
55 secondary pump
60 detector according to the present invention
61 germanium diode
62 preamp
63 cryo-cooling
64 detector interface module
65 processor
100 river (source of cooling water)

The invention claimed is:

1. A method comprising measuring a number of gamma-ray counts indicative of gamma rays emitted by N16 decay by a gamma-ray detector, wherein the gamma-ray detector is positioned at a location that is both:

outside of a biological shield, and inside of an area that includes an exterior section of a primary cooling circuit of a fission nuclear power plant, wherein secondary shielding is positioned between the gamma-ray detector and the exterior section, wherein the location allows the gamma-ray detector to measure gamma rays originating from the exterior section, wherein the location allows for maintenance of the detector during normal operation of the fission nuclear power plant, and wherein the number of gamma ray counts is obtained by integrating, by a computing device in real time, the gamma ray spectrum in a predetermined energy range of approximately 6.1 MeV, determining, by the computing device in real-time, a thermal power of the fission nuclear power plant based on the number of gamma-ray counts measured by the gamma-ray detector, and performing manual maintenance on the gamma-ray detector during normal operation of the fission nuclear power plant, while the gamma-ray detector is at the location.

2. The method of claim 1, wherein the step of measuring a number of gamma-ray counts comprises measuring a number of gamma-ray counts in the gamma-ray detector that are emitted by neutron activation or neutron capture.

3. The method of claim 1, wherein the step of measuring a number of gamma-ray counts comprises measuring a number of gamma-ray counts in the gamma-ray detector that relate to a decay caused by an isotope that has a non-zero half-life of five minutes or less and that is created by a neutron absorption event within the reactor or a cooling water.

4. The method of claim 1, wherein the step of determining the thermal power of the nuclear power plant comprises determining the thermal power of the nuclear power plant based on the number of gamma-ray counts of N16-decays measured in the gamma-ray detector.

5. The method of claim 1, wherein the gamma-ray detector is placed at a distance of less than five meters to the primary cooling circuit.

6. The method of claim 1, wherein the gamma-ray detector is placed directly against or adjacent to the secondary shielding separating the primary cooling circuit from an external environment.

7. The method of claim 1, wherein the step of determining the thermal power of the nuclear power plant comprises determining the thermal power of the nuclear power plant based on a number of gamma-ray counts obtained with the gamma-ray detector and based on a calibration value obtained from a calibration measurement.

8. The method of claim 1, wherein the step of determining the thermal power of the nuclear power plant comprises determining the thermal power of the nuclear power plant based on a number of gamma-ray counts obtained with the gamma-ray detector and based on a geometrical model of the nuclear reactor.

9. The method of claim 1, wherein the step of measuring a number of gamma-ray counts by the gamma-ray detector is performed with a germanium diode or silicon diode.

10. The method of claim 1, wherein the gamma-ray detector is placed outside the biological shield of the fission nuclear power plant to capture gamma rays originating from a primary cooling circuit of the fission nuclear power plant.

* * * * *